(12) United States Patent  (10) Patent No.: US 7,669,871 B2
Watarai  (45) Date of Patent: Mar. 2, 2010

(54) BICYCLE WHEEL SECURING ADAPTER AND BICYCLE FORK USING THE SAME

(75) Inventor: Etsuyoshi Watarai, Izumi (JP)

(73) Assignee: Shimano Inc., Osaka (JP)

( * ) Notice: Subject to any disclaimer, the term of this patent is extended or adjusted under 35 U.S.C. 154(b) by 456 days.

(21) Appl. No.: 11/676,052

(22) Filed: Feb. 16, 2007

(65) Prior Publication Data

US 2008/0197600 A1 Aug. 21, 2008

(51) Int. Cl.
*B62K 21/02* (2006.01)

(52) U.S. Cl. .................... 280/279; 280/288.4; 280/260; 301/124.2

(58) Field of Classification Search ................. 280/279, 280/260, 288.4; 301/124.2, 124.1
See application file for complete search history.

(56) References Cited

U.S. PATENT DOCUMENTS

| | | | | |
|---|---|---|---|---|
| 5,673,925 | A * | 10/1997 | Stewart | 280/279 |
| 5,997,104 | A * | 12/1999 | Campagnolo | 301/110.5 |
| 6,089,675 | A | 7/2000 | Schlanger | |
| 6,409,281 | B1 * | 6/2002 | Kanehisa et al. | 301/110.5 |
| 6,572,199 | B1 * | 6/2003 | Creek et al. | 301/124.1 |
| 7,503,213 | B2 * | 3/2009 | Campbell | 73/488 |
| 2002/0070604 | A1 * | 6/2002 | Kanehisa | 301/110.5 |
| 2004/0149076 | A1 | 8/2004 | Yamanaka | |
| 2004/0169418 | A1 * | 9/2004 | Kanehisa et al. | 301/124.2 |
| 2008/0197600 | A1 * | 8/2008 | Watarai | 280/279 |
| 2008/0211296 | A1 * | 9/2008 | Takachi | 301/124.2 |
| 2008/0284127 | A1 * | 11/2008 | Watarai | 280/279 |
| 2009/0115241 | A1 * | 5/2009 | Kanehisa | 301/124.2 |

FOREIGN PATENT DOCUMENTS

| | | |
|---|---|---|
| FR | 893959 | 12/1944 |
| FR | 983137 | 6/1951 |
| GB | 2 345 893 A | 7/2000 |

* cited by examiner

*Primary Examiner*—Lesley Morris
*Assistant Examiner*—Tashiana Adams
(74) *Attorney, Agent, or Firm*—Global IP Counselors, LLP

(57) ABSTRACT

A wheel securing adapter is provided in a bicycle fork to attach a skewer of a wheel securing axle thereto. The wheel securing adapter is disposed in an axle mounting opening of the fork. The wheel securing adapter has an internally threaded bore and an external surface configured and arranged to cooperate with the axle mounting opening to prevent at least one of relative axial movement and relative rotational movement of the wheel securing adapter within the axle mounting opening. The fork includes a pair of fork legs having upper ends coupled to the fork stem and lower ends with axle mounting openings. Preferably, a cutout surrounds one of the axle mounting openings on an inner side surface that faces the other fork leg to form the mounting opening for the wheel securing adapter.

23 Claims, 14 Drawing Sheets

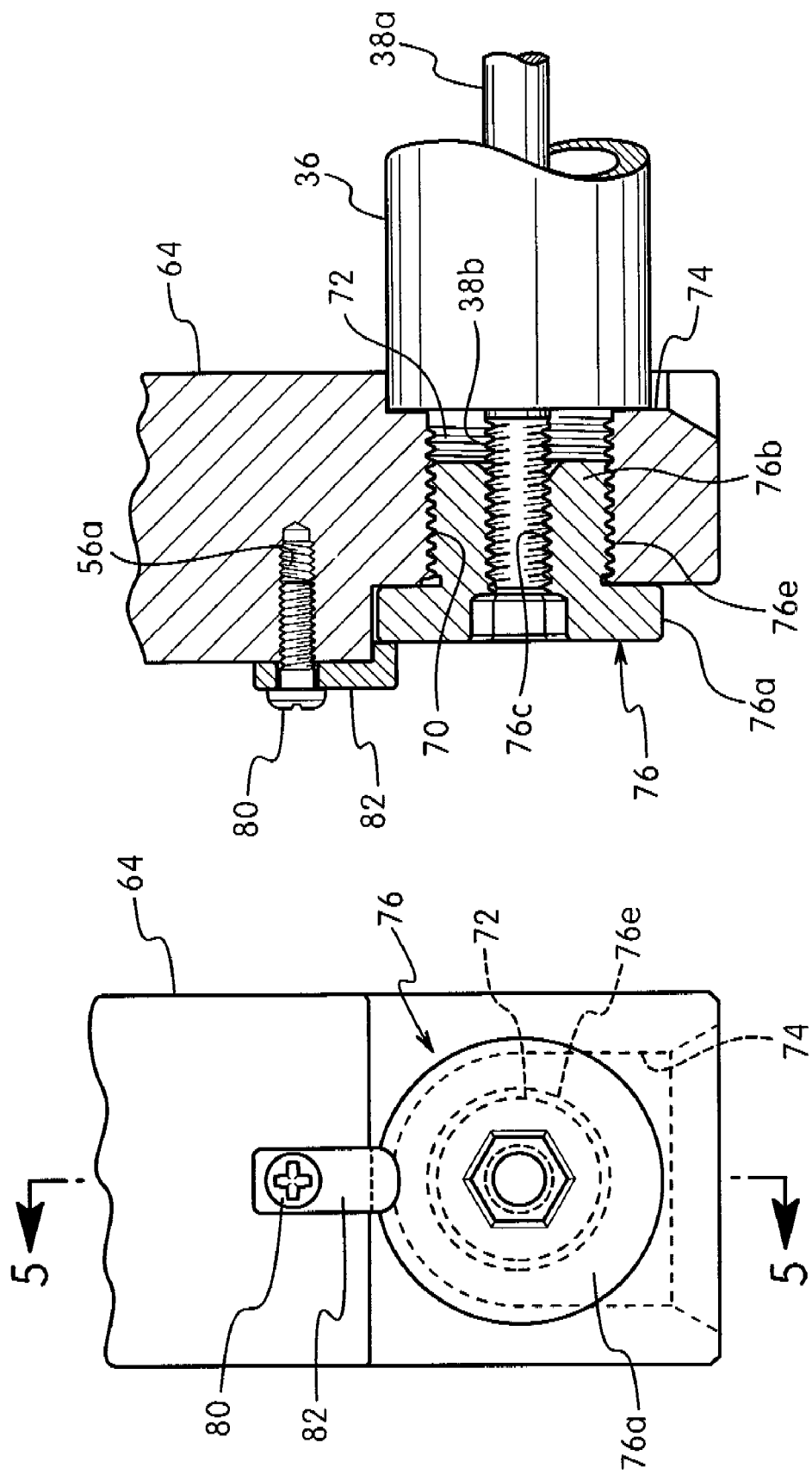

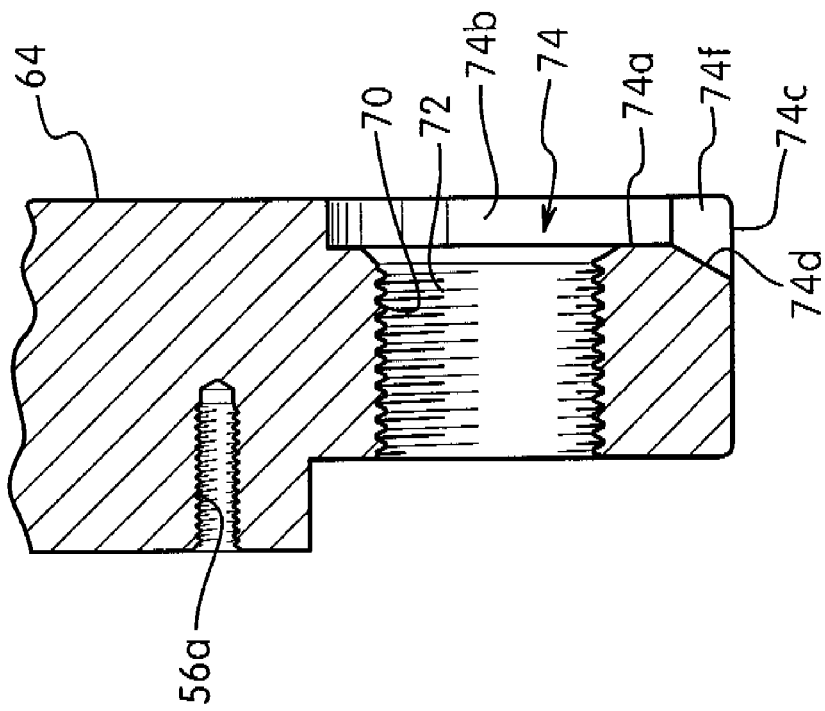
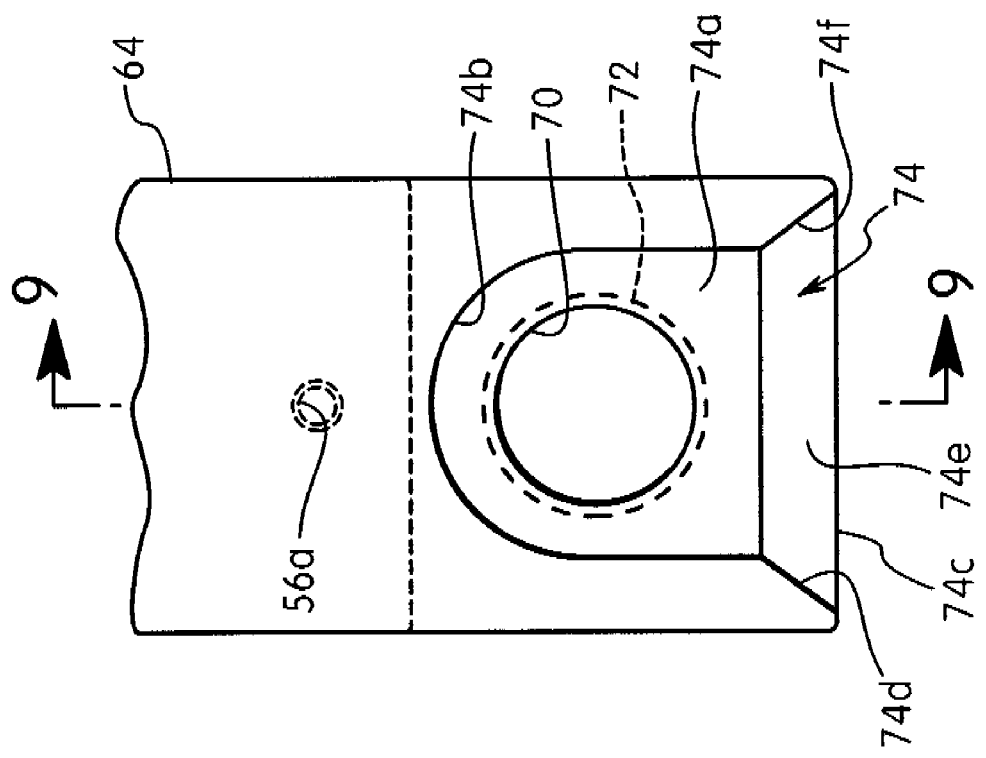

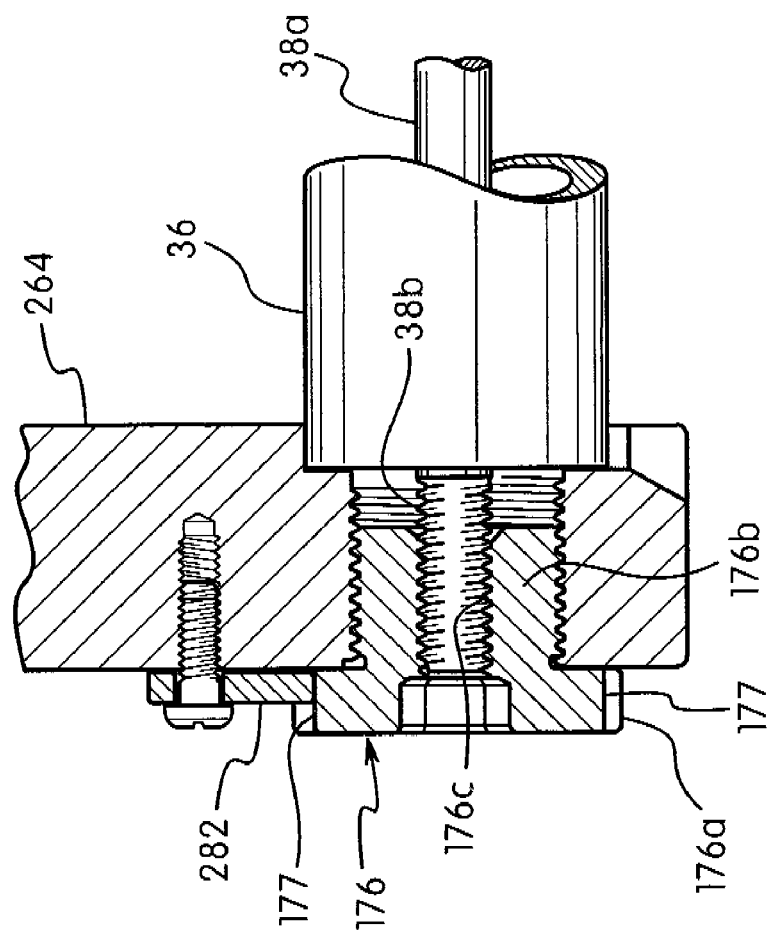
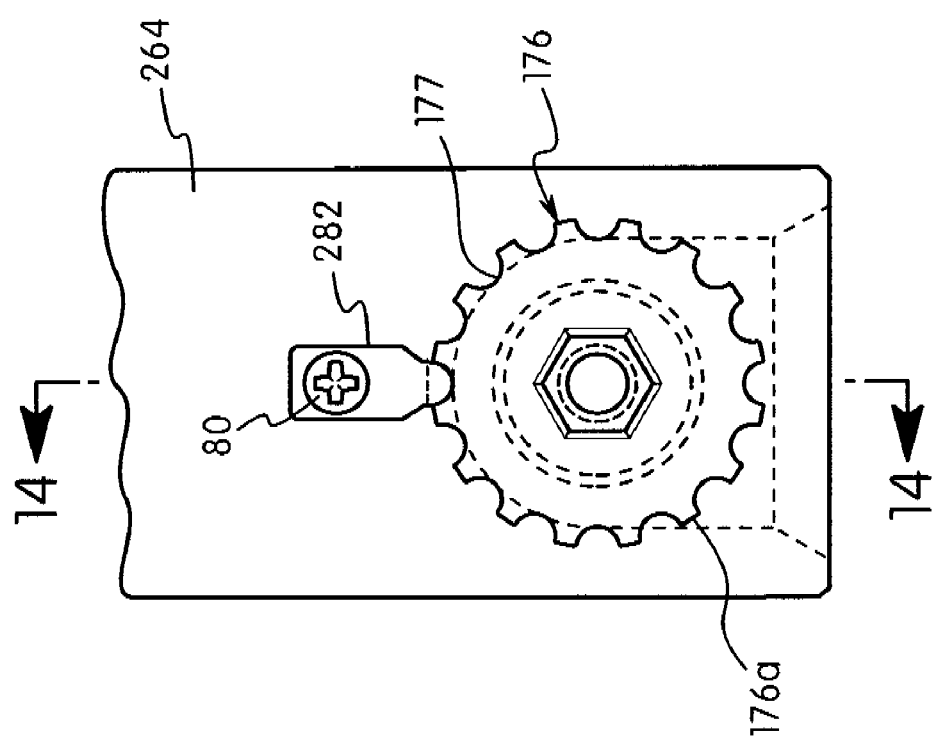
Fig. 14
Fig. 13

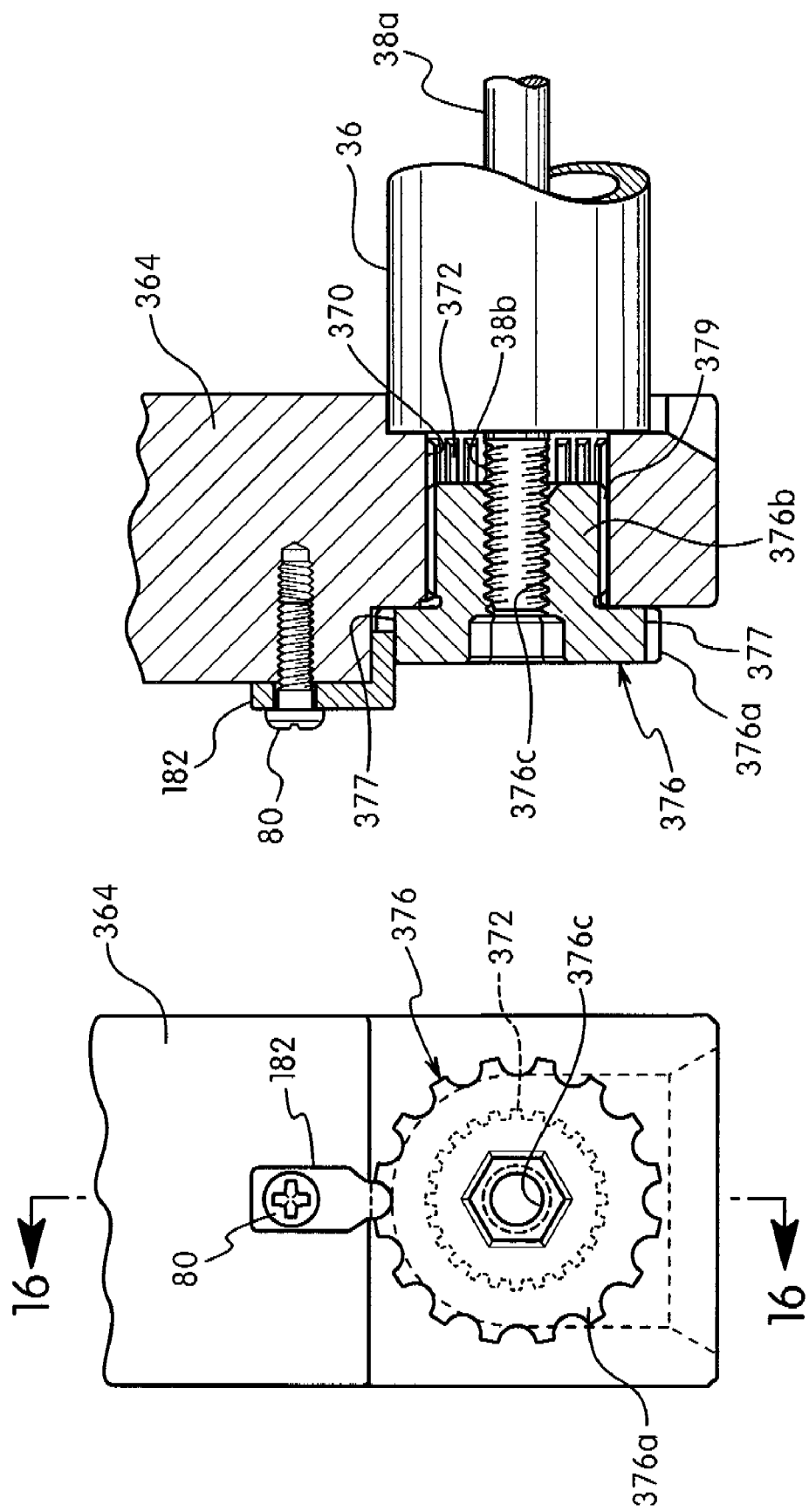

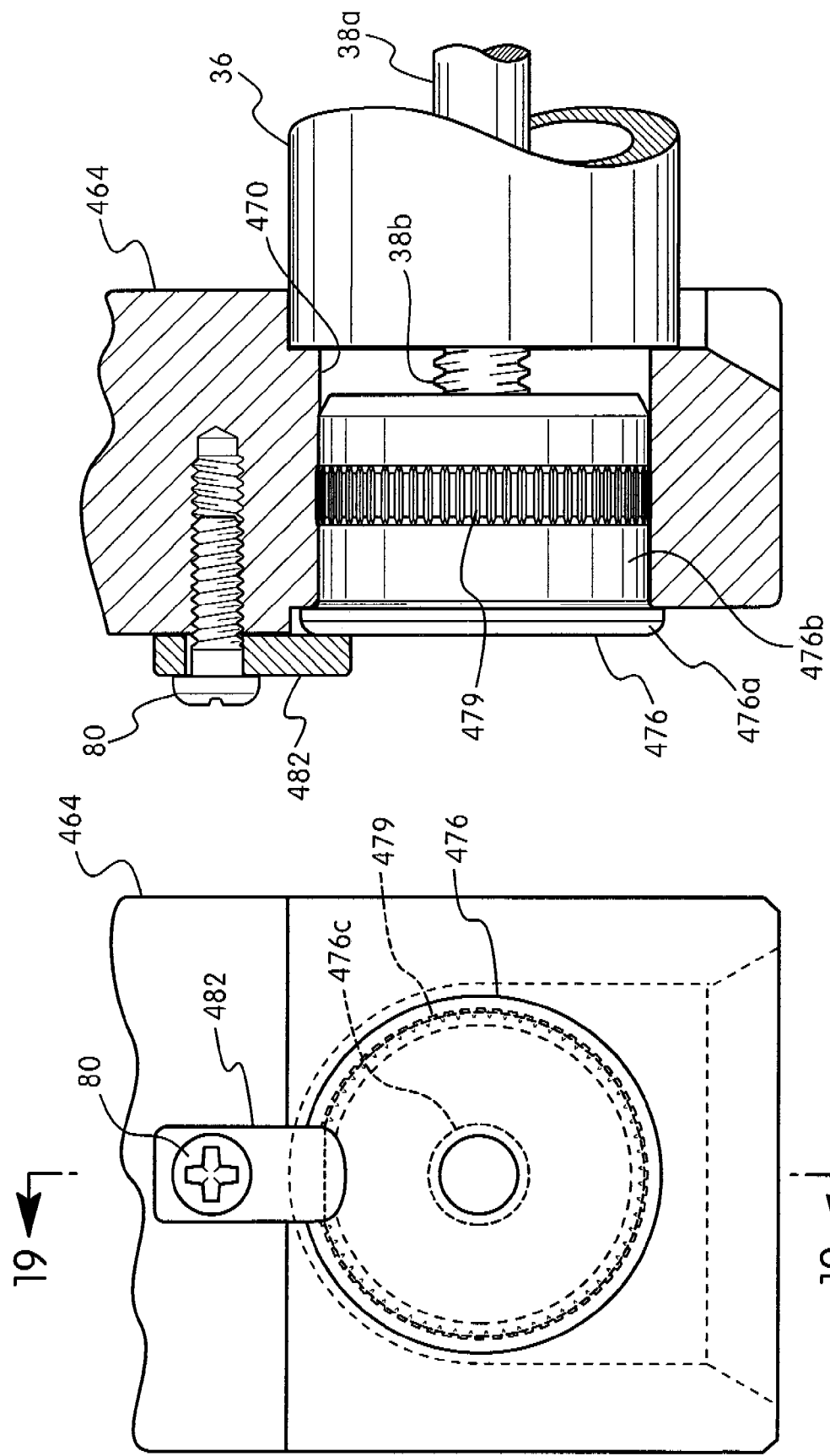

BICYCLE WHEEL SECURING ADAPTER AND BICYCLE FORK USING THE SAME

BACKGROUND OF THE INVENTION

1. Field of the Invention

This invention generally relates to a connection between a bicycle fork and a wheel securing axle of a bicycle hub. More specifically, the present invention relates to an adapter for attaching the wheel securing axle of the bicycle hub to the bicycle fork.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

A bicycle is generally provided with a frame that constitutes the body framework of the bicycle and a front fork that is connected in a freely rotatable manner to a front end portion of the frame. The front fork basically includes a fork stem, a fork crown and a pair of fork legs. The two fork legs are arranged on both sides of the front wheel with the tip end portions of the fork legs being connected to a front hub arranged on the rotational center of the front wheel. The fork crown is connected to the upper end portions (i.e., opposite ends from the tip end portions) of the fork legs. The fork stem is connected to the fork crown, and is arranged to extend upwardly form the fork crown. The fork stem is supported on the front end portion of the frame in a freely rotatable manner. In some cases, the front fork is a suspension fork with each of the fork legs including an upper or inner tube and a lower or outer tube that is telescopically arranged with the upper tube.

Typically, the lower tip ends of the forks are provided with dropouts (open ended slots) for attaching the front hub. In the past, the ends of the hub axle were inserted into the dropouts (open ended slots) and then fastened with nuts. However, since bicycle wheels often need to be removed from the frame, e.g., whenever there is a flat tire or a need to transport the bicycle in an automobile, wheel securing mechanisms were developed in order to facilitate easier removal and reinstallation of the wheels. A typical wheel securing device includes a skewer with a threaded end having a wheel securing member mounted at the other end. The wheel securing member includes a base with a lever and a cam structure. A nut is detachably threaded onto the threaded end of the skewer after the skewer is inserted through the hub body. The fork flanges of the frame are arranged adjacent the base of the wheel securing member and the hub body and between the nut and the hub body, respectively. Thus, the hub can be attached to the frame by clamping the fork flanges using the wheel securing lever. While these typical wheel securing mechanisms generally work well, a tighter connection between the hub and the frame has been in demand for some riders.

Thus, bicycle front hubs and bicycle front forks have been designed such that an axle of the hub is threadedly attached directly to the bicycle front fork. An example of this type of arrangement is disclosed in U.S. Pat. No. 6,089,675. With this type of arrangement, a knob is provided on the end of the hub axle opposite the threaded end. The knob is used to rotate the axle during installation to both tighten the axle to the front fork and to clamp one fork flange between the knob and the hub. With this type of hub, a tighter connection between the hub and the front fork is possible as compared to typical wheel securing hubs. However, because of this tighter connection, it is necessary to make the front fork stronger.

In view of the above conventional technology, it will be apparent to those skilled in the art from this disclosure that there exists a need for improving connection between a front fork and a wheel securing axle of a front hub. This invention addresses this need in the art as well as other needs, which will become apparent to those skilled in the art from this disclosure.

SUMMARY OF THE INVENTION

One object of the present invention is to provide an adapter that can provide a strong connection between a bicycle fork and a wheel securing axle of a bicycle hub.

Another object of the present invention is to provide a bicycle fork with a wheel securing axle of a bicycle hub attachment structure for easily installing a front hub.

The foregoing objects can basically be attained by providing a bicycle wheel securing adapter comprising a first portion and a second portion. The first portion has a first maximum width. The second portion extends axially from the first portion, with the second portion having a second maximum width that is smaller than the first maximum width of the first portion to form an axially facing abutment surface therebetween. The second portion is configured and arranged to be mounted into an axle mounting opening of a bicycle front fork so that a rotational position of the adapter is adjustable. The first and second portions is arranged to form a first end face on the first portion and a second end face on the second portion with a threaded bore extending axially from the second end face into the second portion.

These and other objects, features, aspects and advantages of the present invention will become apparent to those skilled in the art from the following detailed description, which, taken in conjunction with the annexed drawings, discloses preferred embodiment of the present invention.

BRIEF DESCRIPTION OF THE DRAWINGS

Referring now to the attached drawings which form a part of this original disclosure:

FIG. 4 is a side elevational view of a connection between the fork legs and the wheel securing adapter in accordance with the first embodiment of the present invention;

FIG. 5 is a cross sectional view of the connection between the fork leg and the front hub axle using the wheel securing adapter as seen along section line 5-5 of FIG. 4;

FIG. 8 is an inside elevational view of the lower end portion of one of the fork legs in accordance with the first embodiment of the present invention;

FIG. 9 is a cross sectional view of the lower end portion of one of the fork legs as seen along section line 9-9;

FIG. 13 is a side elevational view of the connection between a modified outer tube of the fork leg with the wheel securing adapter in accordance with the second embodiment of the present invention;

FIG. 14 is a cross sectional view of the modified fork leg with the hub axle and the wheel securing adapter connected thereto as seen along section line 14-14 of FIG. 13;

FIG. 15 is a side elevational view of a connection between the fork leg and a wheel securing adapter in accordance with a third embodiment of the present invention;

FIG. 16 is a cross sectional view of part of the hub axle and a modified fork leg using the wheel securing adapter as seen along section line 16-16 of FIG. 15;

FIG. 18 is a side elevational view of a connection between a modified fork leg and a wheel securing adapter in accordance with a fourth embodiment of the present invention;

FIG. 19 is a cross sectional view of part of the modified fork leg and the hub axle using the wheel securing adapter as seen along section line 19-19 of FIG. 18.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
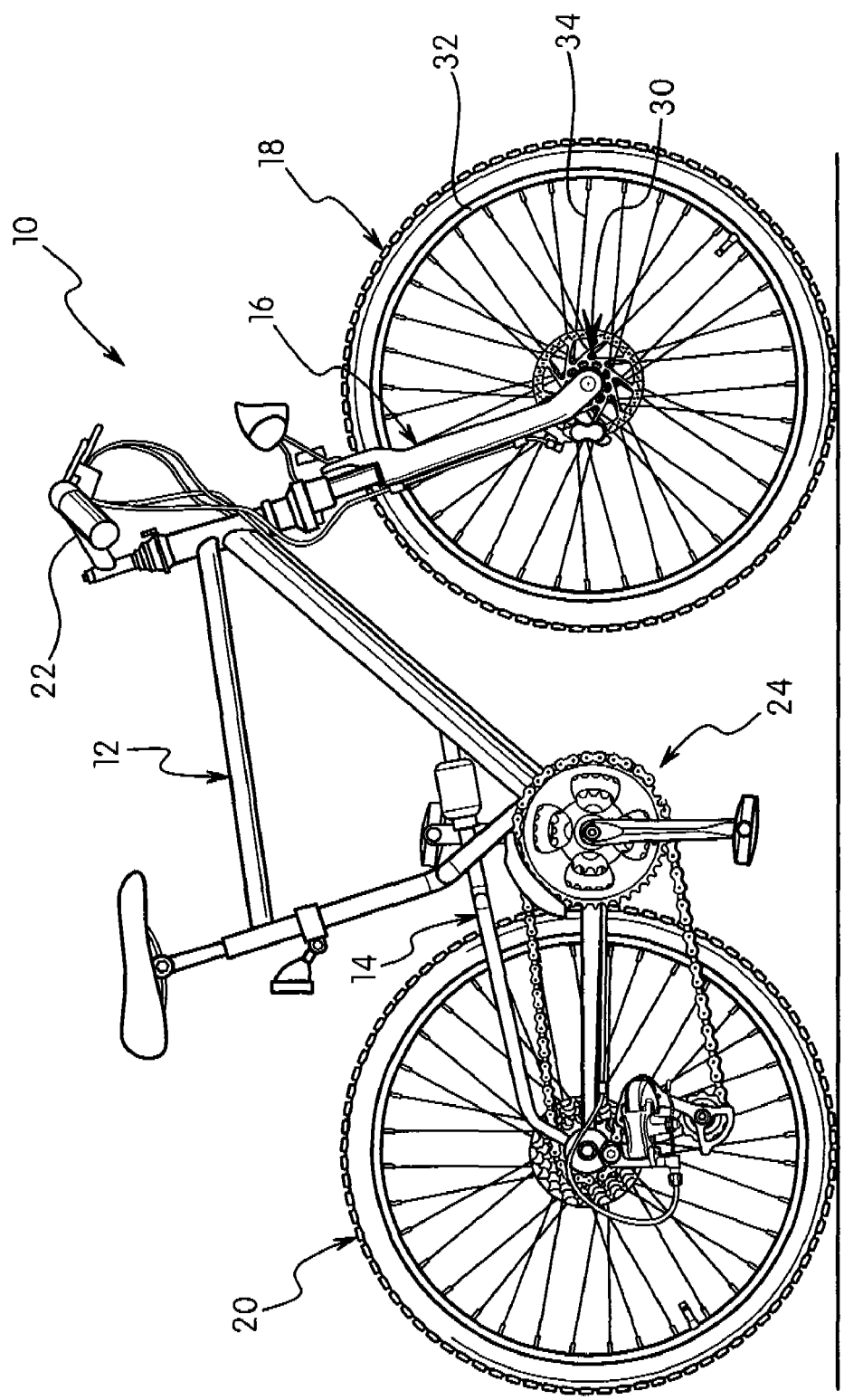
FIG. 1 is a side elevational view of a bicycle with a front fork having a wheel securing adapter that can provide a strong connection between the front fork and a front hub axle in accordance with a first embodiment of the present invention.
Figure 2:
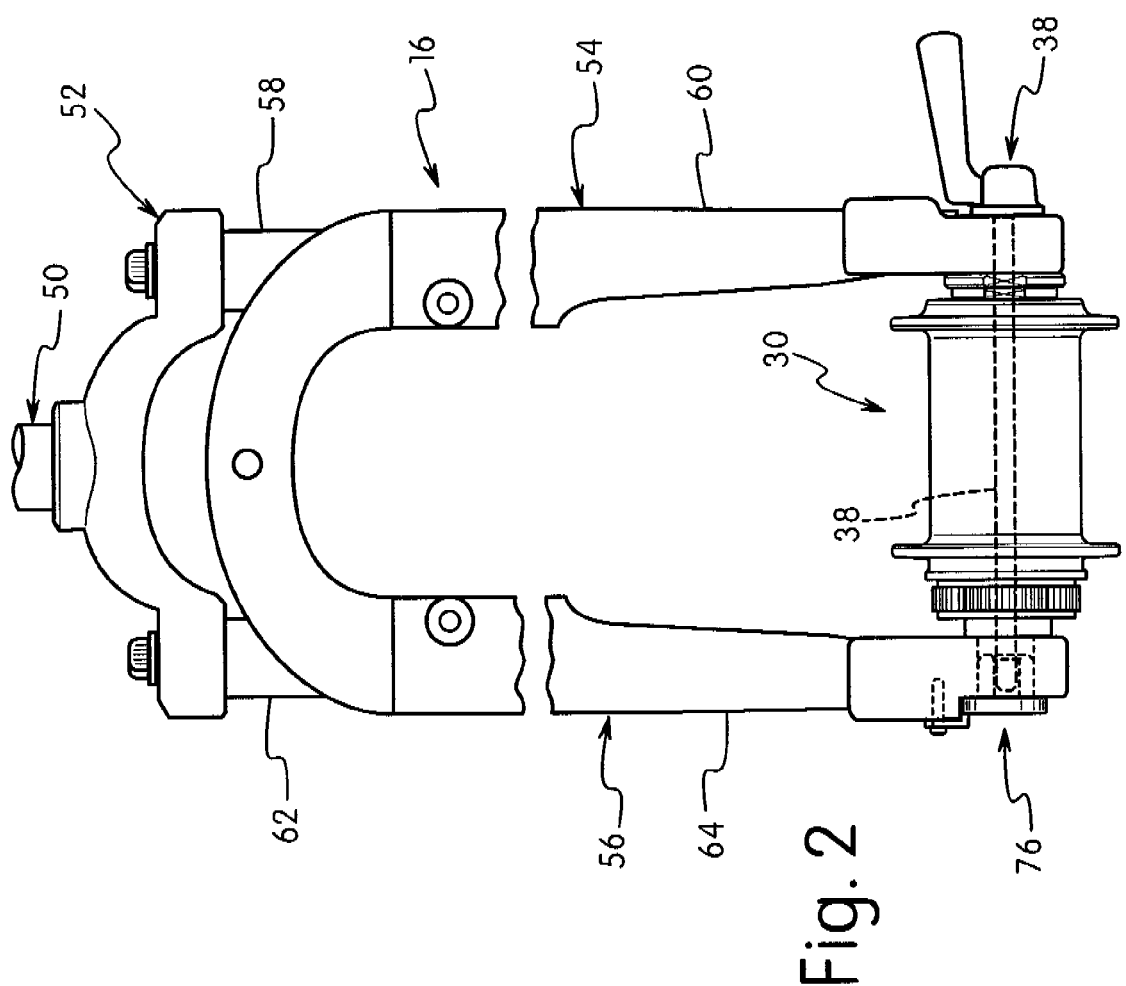
FIG. 2 is a partial front elevational view of the front fork with the front hub connected to the front fork in accordance with the first embodiment of the present invention.

Referring initially to FIGS. 1 and 2, a bicycle 10 is illustrated that is configured in accordance with the present invention. The bicycle 10 basically includes, among other things, a main frame 12, a rear swing arm 14, a front suspension fork 16, a front wheel 18, a rear wheel 20, a handle bar 22 and a drive train 24. The handle bar 22 is fastened to the front suspension fork 16 (hereinafter "front fork"). The drive train 24 is a conventional drive train that basically includes a chain, a front crankset, a rear cassette sprocket set, a pair of pedals, a pair of derailleurs, etc. The bicycle 10 and its various components are conventional, except for the front fork 16. Accordingly, the bicycle 10 and its various components will not be discussed and/or illustrated in detail herein, except as related to the front fork 16 of the present invention. Moreover, it will be apparent to those skilled in the bicycle art from this disclosure that various modifications can be made to the bicycle 10 and its components without departing from the present invention. For example, the rear swing arm 14 can be constructed with a connection similar to the between the front fork 16 of the present invention. Also the present invention can be applied to a non-suspension fork and/or to a chain stay.

As seen in FIGS. 1 and 2, the front wheel 18 basically includes a front hub 30, a rim 32, a plurality of tension spokes 34 extending between the front hub 30 and the rim 32. A tire is mounted on the rim 32 in a conventional manner. The front wheel 18 is conventional wheel, and thus, will not be discussed and/or illustrated in detail herein. Rather, only the front hub 30 will be briefly discussed to understand the front fork 16 of the present invention.

Figure 3:
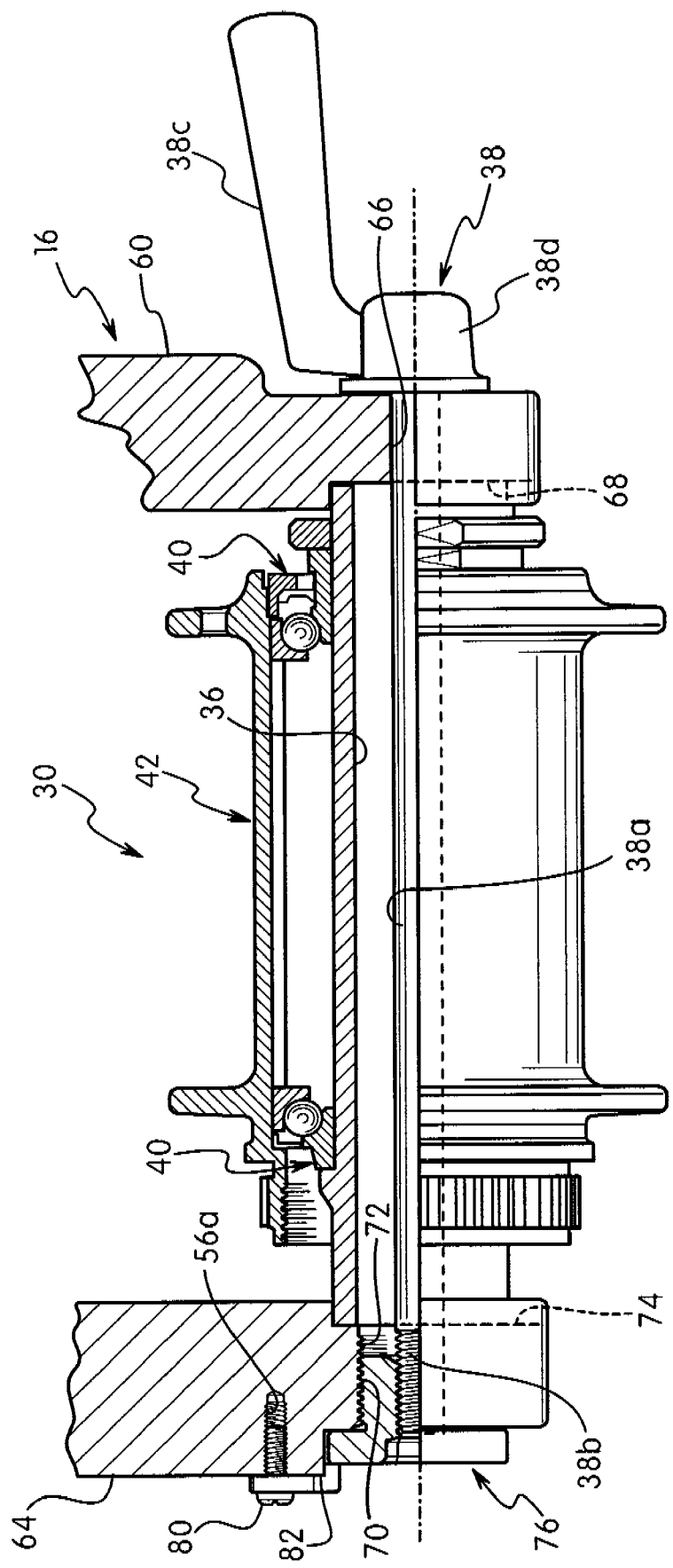
FIG. 3 is a partial longitudinal cross sectional view of the front hub mounted to the front fork using the wheel securing adapter in accordance with the first embodiment of the present invention.
Figure 6:
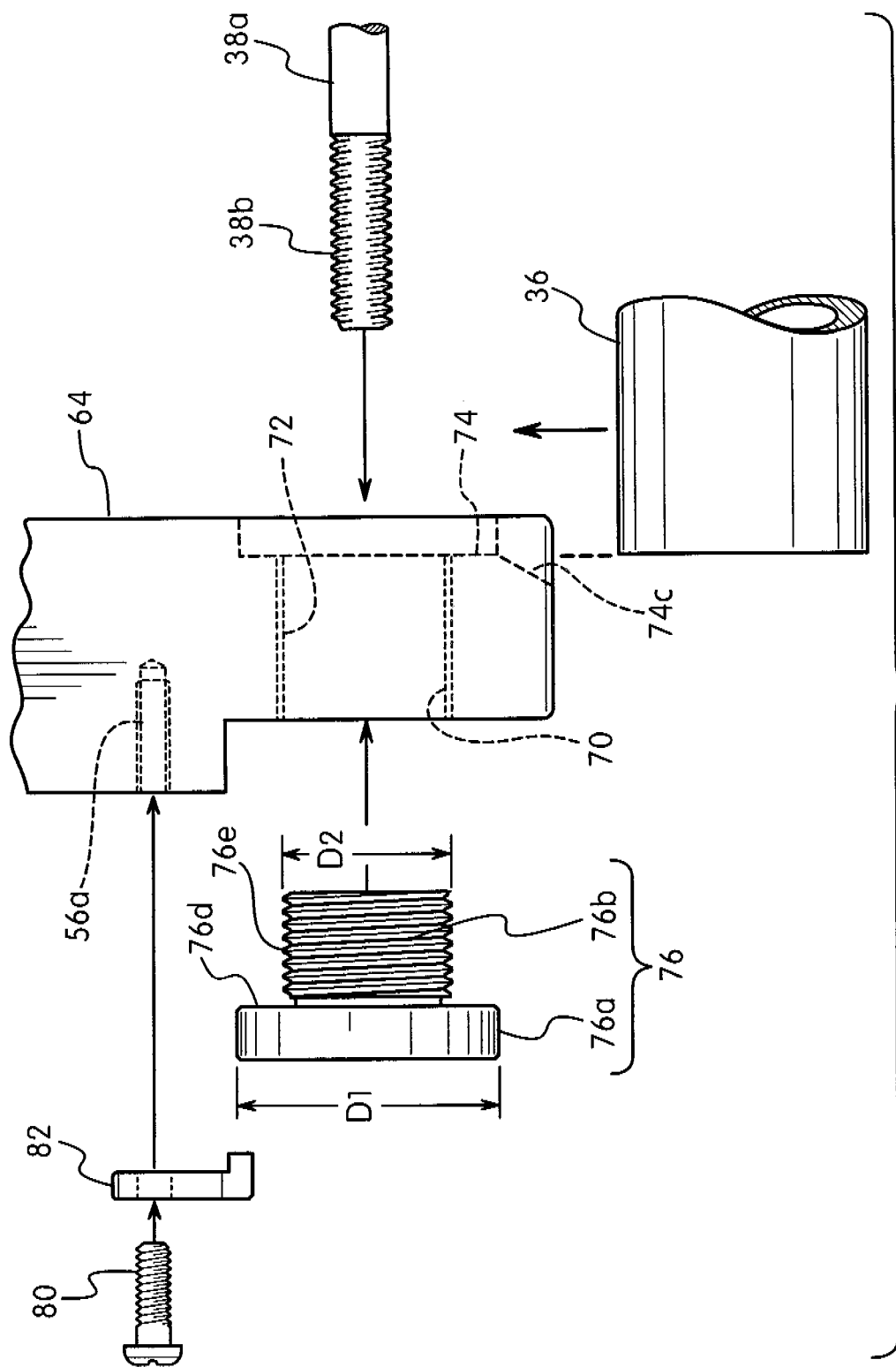
FIG. 6 is an exploded, side elevational view of the connection between the fork leg and the front hub axle using the wheel securing adapter in accordance with the first embodiment of the present invention.

As seen in FIGS. 2 and 3, the front hub 30 basically includes a hollow hub axle 36 with a wheel securing axle 38, a pair of bearing units 40 and a hub shell 42. The wheel securing axle 38 fixes the hollow hub axle 36 to the front fork 16 so that the hub shell 42 can rotate about the hollow hub axle 36 by the bearing units 40. In particular, the wheel securing axle 38 has a skewer 38a that extends through the hollow hub axle 36. One end of the skewer 38a has an external thread 38b, while the other end of the skewer 38a has a cam lever 38c pivotally mounted thereto by a steel cam (not shown) and a cam cap 38d that surrounds the cam of the cam lever 38c. The cam cap 38d is the part of the wheel securing axle 38 that moves back and forth when the cam lever 38c is flipped from a release or open position to a clamping or closed position.

When swinging the cam lever 38c from full open, to full closed, one should just start to feel some resistance when the cam lever 38c is pointing straight out (sideways or perpendicular) from the wheel 18. This resistance should start getting harder at about two-thirds the way closed, and really hard up to the three-quarter point closed (still one-quarter open). Then, turning of the cam lever 38c typically get easier the rest of the way. Thus, the cam lever 38c has moves "over the top" of its cam. However, some wheel securing axles just get progressively tighter without any perceptible feel of "going over the top".

As seen in FIG. 1, the front fork 16 is rotatably mounted to a head tube in a front part of the main frame 12, and is used to steer the front wheel 18. As seen in FIG. 2, the front fork 16 basically includes a fork stem or steerer tube 50, a fork crown 52 and a pair of fork legs 54 and 56. The fork legs 54 and 56 are arranged on both sides of the front wheel 18 with the tip end portions of the fork legs 54 and 56 being connected to the front hub 30 that is arranged on the rotational center of the front wheel 18. In particular, the front fork 16 is a suspension fork in which the fork leg 54 includes an upper or inner tube 58 and a lower or outer tube 60 that is telescopically arranged with the upper tube 58, while the fork leg 56 includes an upper or inner tube 62 and a lower or outer tube 64 that is telescopically arranged with the upper tube 62. The fork crown 52 is connected to the upper ends of the upper tubes 58 and 62 (i.e., opposite ends from the tip end of the lower tubes 60 and 64) of the fork legs 54 and 56. The fork stem 50 is connected to the fork crown 52, and is arranged to extend upwardly form the fork crown 52. The fork stem 50 is supported on the front end portion of the main frame 12 in a freely rotatable manner.

As seen in FIG. 3, the lower end of the outer tube 60 of the (first) fork leg 54 includes a first axle mounting opening or bore 66 that is unthreaded and a cutout 68 that receives one end of the hollow hub axle 36. The lower end of the outer tube 64 of the (second) fork leg 56 includes a second axle mounting opening or bore 70 with an internal thread 72 and a cutout 74 that receives one end of the hollow hub axle 36. The axle mounting bore 70 is configured and arranged to receive a wheel securing adapter 76 in a releasable and reinstallable manner. In other words, the wheel securing adapter 76 can be installed, removed and reinstalled without damaging the lower end of the outer tube 64 of the fork leg 56.

As seen in FIGS. 4 to 7, the wheel securing adapter 76 is a one-piece, unitary member that is formed of a hard rigid material. Preferably, the material of the wheel securing adapter 76 is harder than the material of the outer tube 64 of the fork leg 56. The wheel securing adapter 76 includes a first adapter portion 76a and a second adapter portion 76b with an internally threaded bore 76c extending completely through both the first and second adapter portions 76a and 76b. Thus, the first and second adapter portions 76a and 76b are arranged to form a first end face on the first adapter portion 76a with a first opening and a second end face on the second adapter portion 76b with a second opening in which the internally threaded bore 76c extending axially from the first end face into the first adapter portion 76a to the second end face into the second adapter portion 76b. Alternatively, the internally threaded bore 76c could be a blind bore that only extends from the second end face on the second adapter portion 76b to the interface between the first and second adapter portions 76a and 76b. The internally threaded bore 76c threadedly engages the external thread 38b of the end of the skewer 38a of the wheel securing axle 38 to secure the hollow hub axle 36 to the outer tube 64 of the fork leg 56.

The external surface (e.g., the external thread 76e in this embodiment) is configured and arranged to cooperate with the axle mounting bore 70 to prevent relative axial movement and relative rotational movement of the wheel securing adapter 76 within the axle mounting bore 70. In particular, when the wheel securing axle 38 is threaded into the internally threaded bore 76c of the wheel securing adapter 76, an axial reaction force is applied between the internal thread 72 of the axle mounting bore 70 and the external thread 76e of the wheel securing adapter 76. This axial reaction force between the internal thread 72 and the external thread 76e prevents the wheel securing adapter 76 from moving either axially or rotationally relative to the outer tube 64 of the fork leg 56. However, preferably, the outer tube 64 of the fork leg 56 has a threaded hole 56a for threadedly receiving a bolt 80 to secure a locking tab 82 thereto. When this locking tab 82 is installed, the locking tab 82 partially overlaps the axle mounting bore 70 as viewed in an axial direction of the axle mounting bore 70, and contacts the first end face on the first adapter portion 76a. Thus, when locking tab 82 is installed, the locking tab 82 prevents the wheel securing adapter 76 from moving axially relative to the outer tube 64 of the fork leg 56. Since the locking tab 82 prevents the wheel securing adapter 76 from moving axially relative to the outer tube 64 of the fork leg 56, the locking tab 82 prevents the wheel securing adapter 76 from unthreading (rotating). Further, by rotating the bolt 80, a user can adjust the axial position of the locking tab 82, and thereby, the final rotational position of the adapter 76 can also be adjusted. Thus, the second adapter portion 76b is mounted into the axle mounting bore 70 of the front fork 16 so that the rotational position of the adapter 76 is adjustable.

Figure 7:
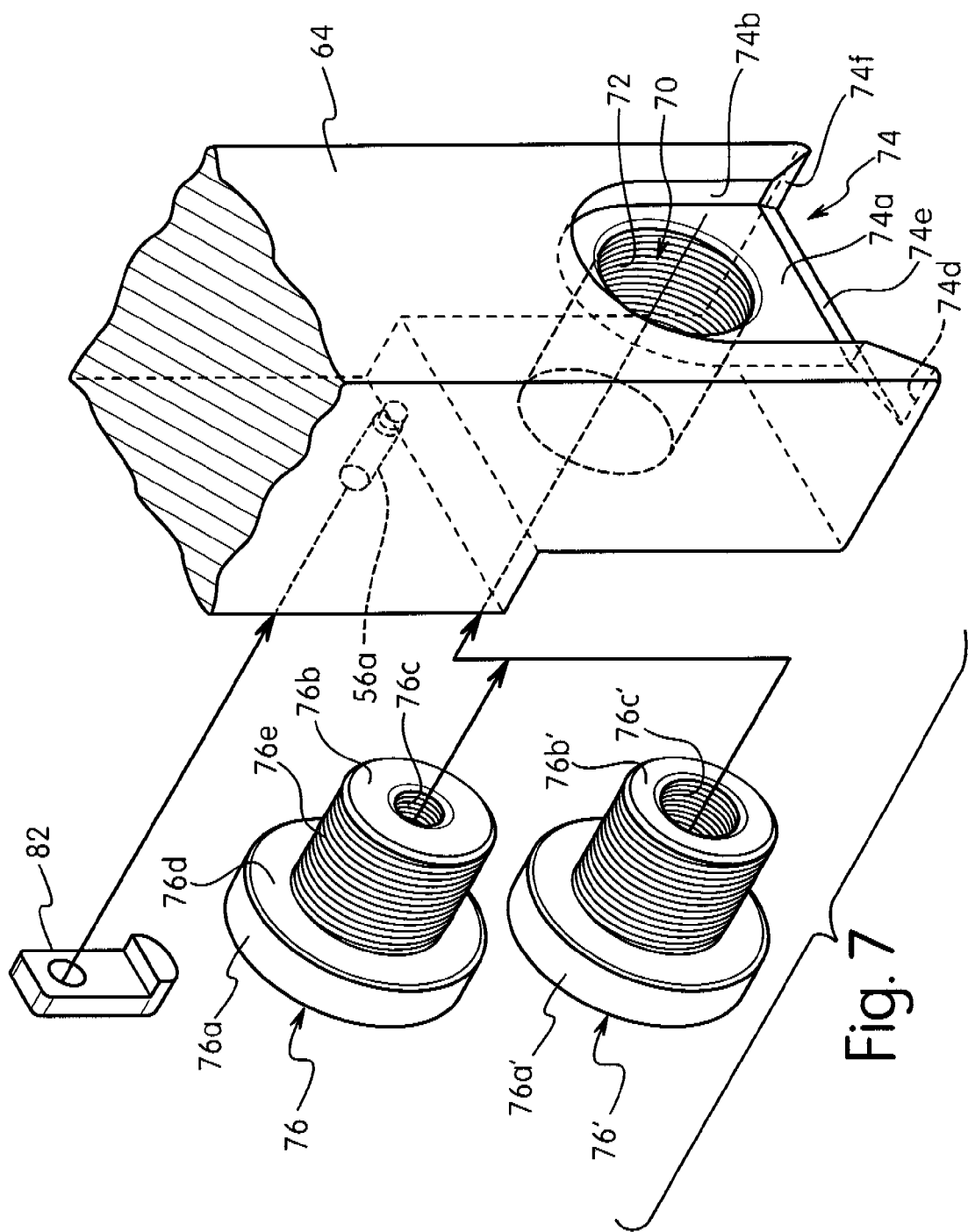
FIG. 7 is an exploded perspective view of the fork leg and two of the wheel securing adapters in accordance with the first embodiment of the present invention.

The first adapter portion 76a has cylindrical shaped with a first maximum width or diameter D1. The second adapter portion 76b extends axially from the first adapter portion 76a. The second adapter portion 76b has a second maximum width or diameter D2 that is smaller than the first maximum or diameter D1 of the first adapter portion 76a to form an axially facing abutment surface 76d therebetween. The external surface of the second adapter portion 76b includes an external thread 76e that threadedly engages the internal thread 72 of the axle mounting bore 70 formed in the outer tube 64 of the fork leg 56. Since the wheel securing adapter 76 reinstallable into the axle mounting bore 70, different size wheel securing adapters can be used with the front fork 16 so that different size wheel securing axles can be used. For example, as seen in FIG. 7, an additional wheel securing adapter 76' is illustrated that includes a first adapter portion 76a' and a second adapter portion 76b' with an internally threaded bore 76c' extending completely therethrough. The additional wheel securing adapter 76' is identical to the wheel securing adapter 76, except that the internally threaded bore 76c' has a larger diameter than the through bore 76c. By selecting adapters having various diameters of threaded through bores, the wheel securing skewers having various diameters can be used as needed and/or desired without changing the diameter of the axle mounting bore 70 of the front fork 16. Thus, this arrangement allows for a single front fork to be used with different size hubs. For example, if weight savings is desired, then a user can use a hub with a wheel securing skewer having a smaller diameter. Alternatively, if a higher rigidity is desired in the hub, then a user can use a hub with a wheel securing skewer having a larger diameter. Furthermore, by rotating the adapter, the user can adjust the screw starting point of the wheel securing skewer into the adapter to a desired location. By adjusting the screw starting point of the wheel securing skewer into the adapter, it is also possible to adjust the final position of the wheel securing lever when the wheel securing lever is completely screwed in to the final fixing position. Thus, a user can adjust the final position of the wheel securing lever by rotating the adapter as he/she wants, e.g. such that the wheel securing lever does not accidentally move to the open position by contacting against a foreign object (such as rocks, immoderate undulation of ground, or the like) during a ride of a bicycle.

Turning to FIGS. 7 to 9, the lower end of the outer tube 64 of the fork leg 56 will be discussed in more detail. As mentioned above, the inner sides of the lower ends of the outer tubes 60 and 64 of the fork legs 54 and 56 are provided with the cutouts 68 and 74, respectively to aid in the installation of the front hub 30. The cutout 68 is a mirror image of the cutout 74 of the lower end of the outer tube 64 of the (second) fork leg 56. Thus, only the cutout 74 of the outer tube 64 of the fork leg 56 will be discussed below.

The cutout 74 surrounds the axle mounting bore 70 on the inner side surface of the outer tube 64 of the fork leg 56 that faces the lower end of the outer tube 60 of the fork leg 54. The cutout 74 is basically defined by an end abutment or inner stepped surface 74a and a peripheral abutment surface 74b with an insertion opening 74c being formed at the lower end of the cutout 74. The end abutment surface 74a constitutes a first axial abutment surface that is configured to directly abut against an exposed hub axle end face of the hollow hub axle 36. The peripheral abutment surface 74b constitutes a second lateral abutment surface that is configured to directly abut against an exposed hub axle side face of the hollow hub axle 36. The end abutment surface 74a and the peripheral abutment surface 74b form an inner stepped portion of the cutout 74. The insertion opening 74c is basically a break in the peripheral surface 74b to allow insertion of the exposed hub axle end of the hollow hub axle 36 into the cutout 74. With such an arrangement, rigidity when the front fork 16 and the hub 30 are assembled is improved because of the presence of two abutment surfaces at each lower end of the fork 16. To further improve assembly, the cutout 74 is preferably provided with three tapered guide surfaces 74d, 74e and 74f that define a tapered guide portion of the insertion opening 74c. The tapered guide portion (the tapered guide surfaces 74d, 74e and 74f) is configured for easy insertion of the hollow hub axle 36 into the inner stepped portion of the cutout 74 from a direction parallel to the longitudinal axis of the fork leg 56.

The tapered guide surfaces 74d and 74f constitute a pair of opposed end guide surfaces and the tapered guide surface 74e constitute a central guide surface extending between the tapered guide surfaces 74d and 74f (i.e., the opposed end guide surfaces). The tapered guide surfaces 74d and 74f (i.e., the opposed end guide surfaces) are inclined relative to the lower edges of the peripheral surface 74b (i.e., the second lateral abutment surface). The tapered guide surface 74e (i.e., the central guide surface) is inclined relative to the inner stepped surface 74a (i.e., the first axial abutment surface).

Figure 11:
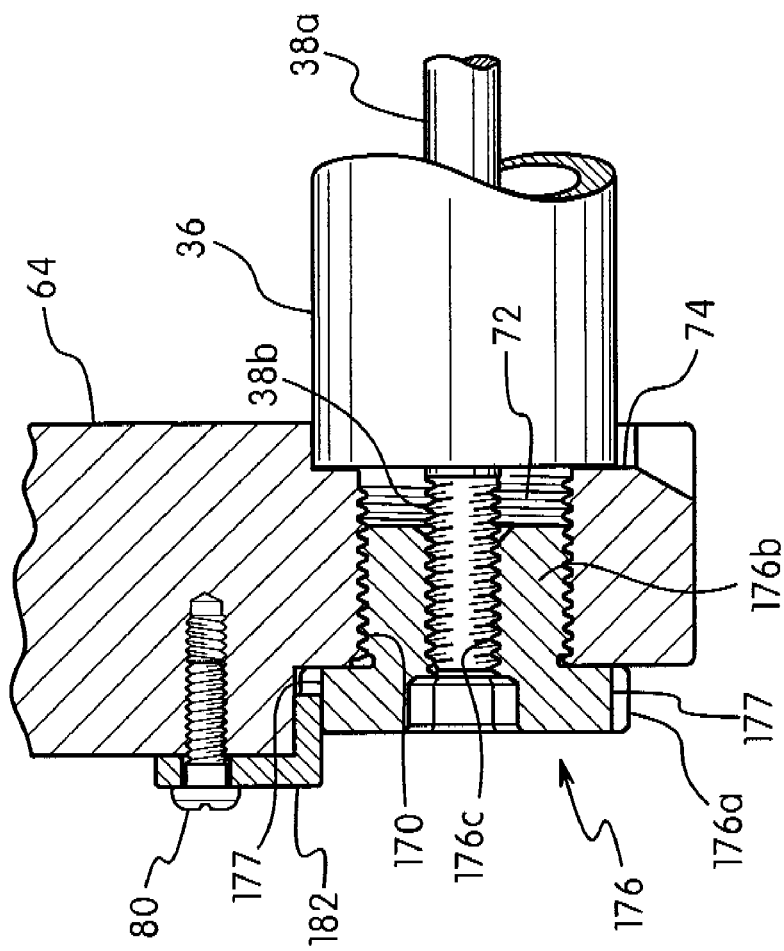
FIG. 11 is a cross sectional view of the connection between the fork leg and the wheel securing adapter as seen along section line 11-11 of FIG. 10.
Figure 10:
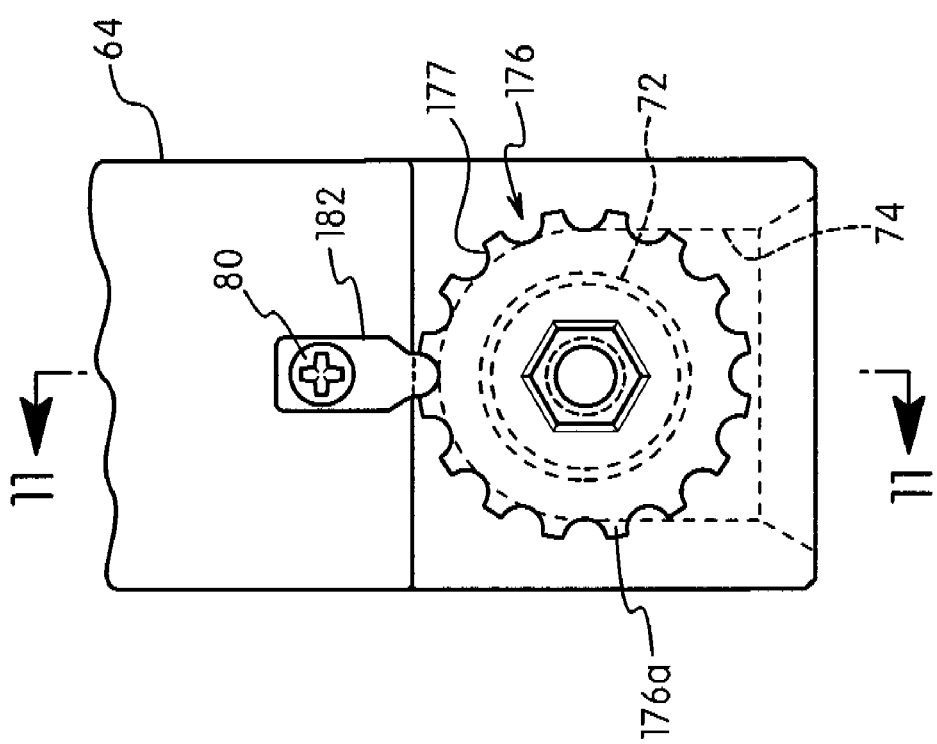
FIG. 10 is a side elevational view of a connection between the fork leg and a wheel securing adapter in accordance with a second embodiment of the present invention.
Figure 12:
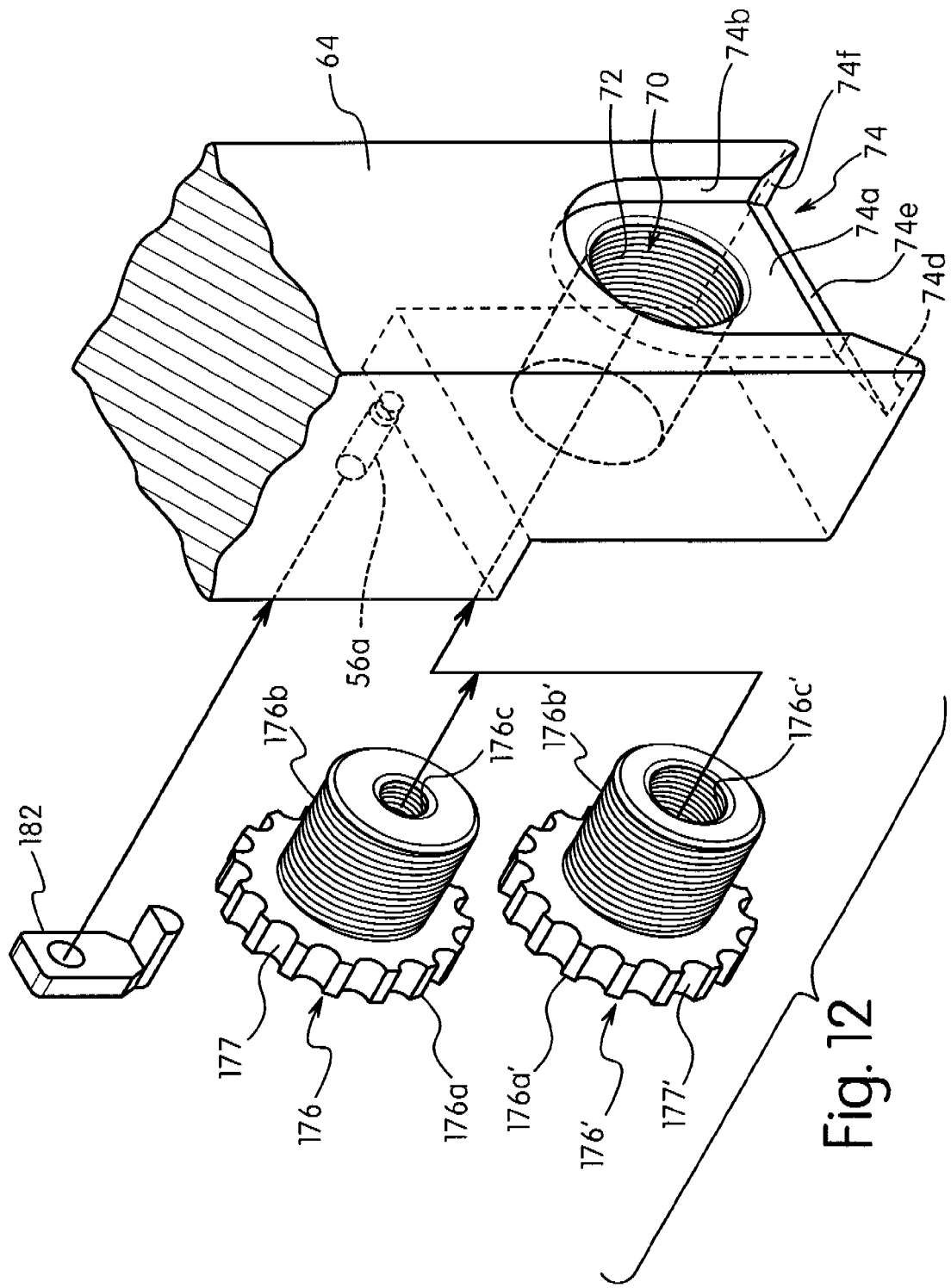
FIG. 12 is an exploded perspective view of one of the fork legs and two of the wheel securing adapters in accordance with the second embodiment of the present invention.

Referring now to FIGS. 10 to 12, a wheel securing adapter 176 is illustrated in accordance with a second embodiment of the present invention. The wheel securing adapter 176 is configured and arranged to be used with the front fork 16 illustrated in FIGS. 1 and 2. The wheel securing adapter 176 is a one-piece, unitary member that is formed of a hard rigid material. Preferably, the material of the wheel securing adapter 176 is harder than the material of the outer tube 64 of the fork leg 56. The wheel securing adapter 176 includes a first adapter portion 176a and a second adapter portion 176b with an internally threaded bore 176c extending completely through both the first and second adapter portions 176a and 176b. The wheel securing adapter 176 is identical to the wheel securing adapter 76, discussed above, except that the external surface of the first adapter portion 176a has plurality of circumferentially spaced apart notches or recesses 177. The recesses 177 selectively receive a locking tab 182 therein to prevent the wheel securing adapter 176 from unthreading. Thus, the locking tab 182 cooperates with one of the recesses 177 to prevent the wheel securing adapter 176 from moving axially or rotating relative to the outer tube 64 of the fork leg 56. Because there are plurality of circumferentially spaced apart recesses 177 as mentioned above, the second adapter portion 176b is mounted into the axle mounting bore 70 of the front fork 16 so that the rotational position of the adapter 176 is adjustable. Furthermore, by rotating the wheel securing adapter 176, the user can adjust the screw starting point of the skewer 38a into the wheel securing adapter 176 to a desired location. Thus, the locking tab 182 also cooperates with one of the recesses 177 to lock the wheel securing adapter 176 in a position with a desired screw starting point for threading the skewer 38a into the wheel securing adapter 176. Since the remaining structures and/or arrangements are the same as the corresponding structures and/or arrangements of the prior embodiment, the wheel securing adapter 176 will not be discussed in further detail.

As seen in FIG. 12, since the wheel securing adapter 176 reinstallable into the axle mounting bore 70, different size wheel securing adapters can be used with the front fork 16 so that different size wheel securing axles can be used. For example, an additional wheel securing adapter 176' is illustrated that includes a first adapter portion 176a' with recesses 177' and a second adapter portion 176b' with an internally threaded bore 176c' extending completely therethrough. The additional wheel securing adapter 176' is identical to the wheel securing adapter 176, except that the internally threaded bore 176c' has a larger diameter than the through bore 176c.

Referring now to FIGS. 13 and 14, a modified outer tube 264 is illustrated with the wheel securing adapter 176 installed therein. The modified outer tube 264 replaces the outer tube 64, and thus the remaining structure of the fork leg 56 is the same as discussed above. The only difference between the modified outer tube 264 and the outer tube 64 is that the shape of the lower end of the modified outer tube 264 has been changed to eliminate the notched in the lower end of the modified outer tube 264 and a different locking tab 282 is used. Since the remaining structures and/or arrangements are the same as the corresponding structures and/or arrangements of one of the prior embodiments, the outer tube 264 will not be discussed in further detail.

Figure 17:
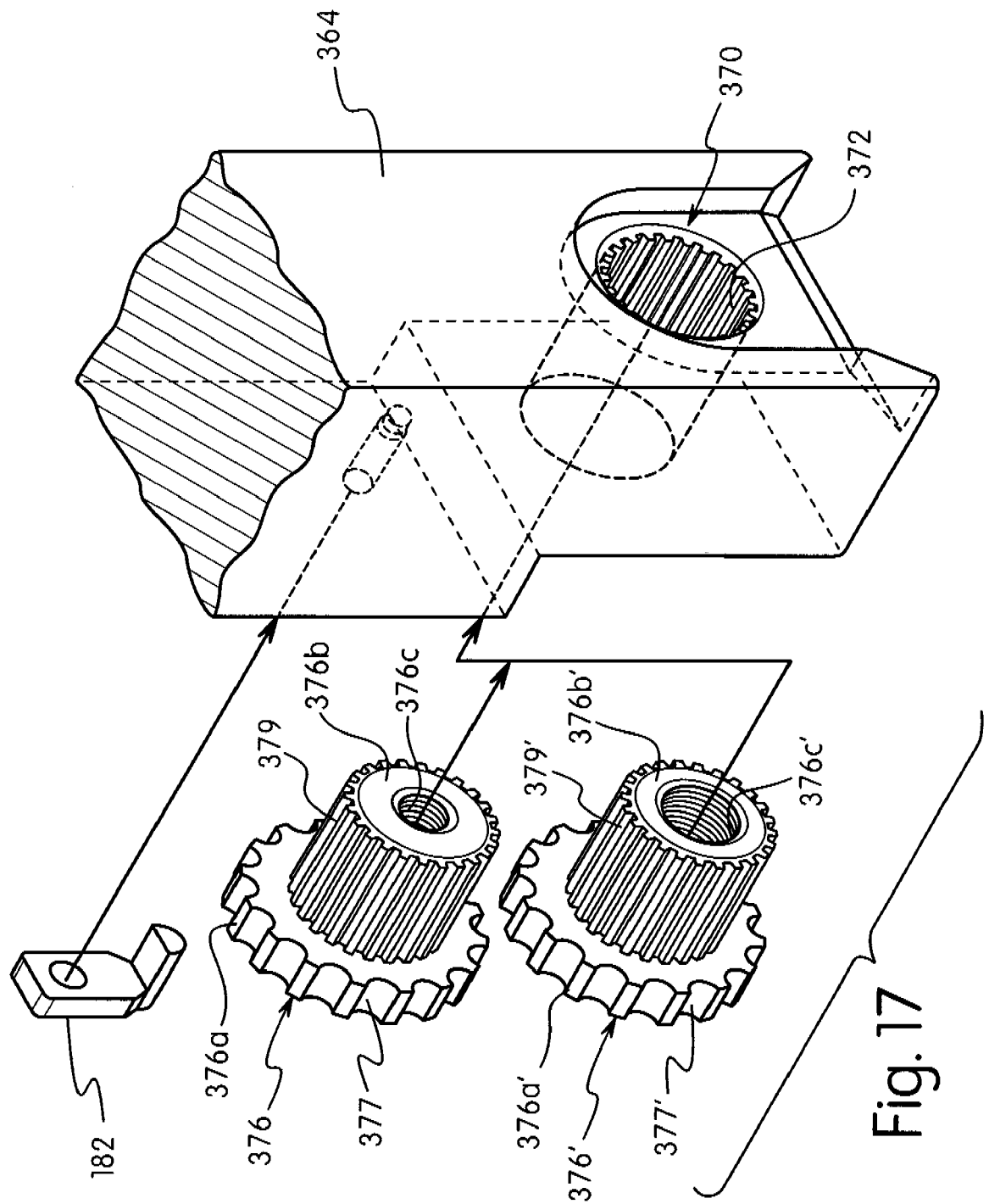
FIG. 17 is an exploded perspective view of the fork leg and the wheel securing adapter in accordance with the third embodiment of the present invention.

Referring now to FIGS. 15 to 17, a modified outer tube 364 with a wheel securing adapter 376 is illustrated in accordance with a third embodiment of the present invention. The modified outer tube 364 replaces the outer tube 64, and thus, the remaining structure of the fork leg 56 is the same as discussed above. The only difference between the modified outer tube 364 and the outer tube 64 is that the internal thread 72 of the axle mounting bore 70 has been changed to a plurality of axially extending splines 372 in an axle mounting bore 370. The wheel securing adapter 376 includes a first adapter portion 376a and a second adapter portion 376b with an internally threaded bore 376c extending completely through both the first and second adapter portions 376a and 376b. The wheel securing adapter 376 is identical to the wheel securing adapter 176, discussed above, except that the external surface of the second adapter portion 376b has a plurality of axially extending splines 379. The splines 379 of the wheel securing adapter 376 mate with the splines 372 of the axle mounting bore 370 of the modified outer tube 364. As with the previous embodiments, the second adapter portion 376b is mounted into the axle mounting bore 370 of the outer tube 364 so that the rotational position of the adapter 376 is adjustable. Since the remaining structures and/or arrangements are the same as the corresponding structures and/or arrangements of one of the prior embodiments, the outer tube 364 and the wheel securing adapter 376 will not be discussed in further detail.

As seen in FIG. 17, since the wheel securing adapter 376 reinstallable into the axle mounting bore 370, different size wheel securing adapters can be used with the front fork so that different size wheel securing axles can be used. For example, an additional wheel securing adapter 376' is illustrated that includes a first adapter portion 376a' with recesses 377' and a second adapter portion 376b' with an internally threaded bore 376c' extending completely therethrough and external splines 379'. The additional wheel securing adapter 376' is identical to the wheel securing adapter 376, except that the internally threaded bore 376c' has a larger diameter than the through bore 376c.

Figure 20:
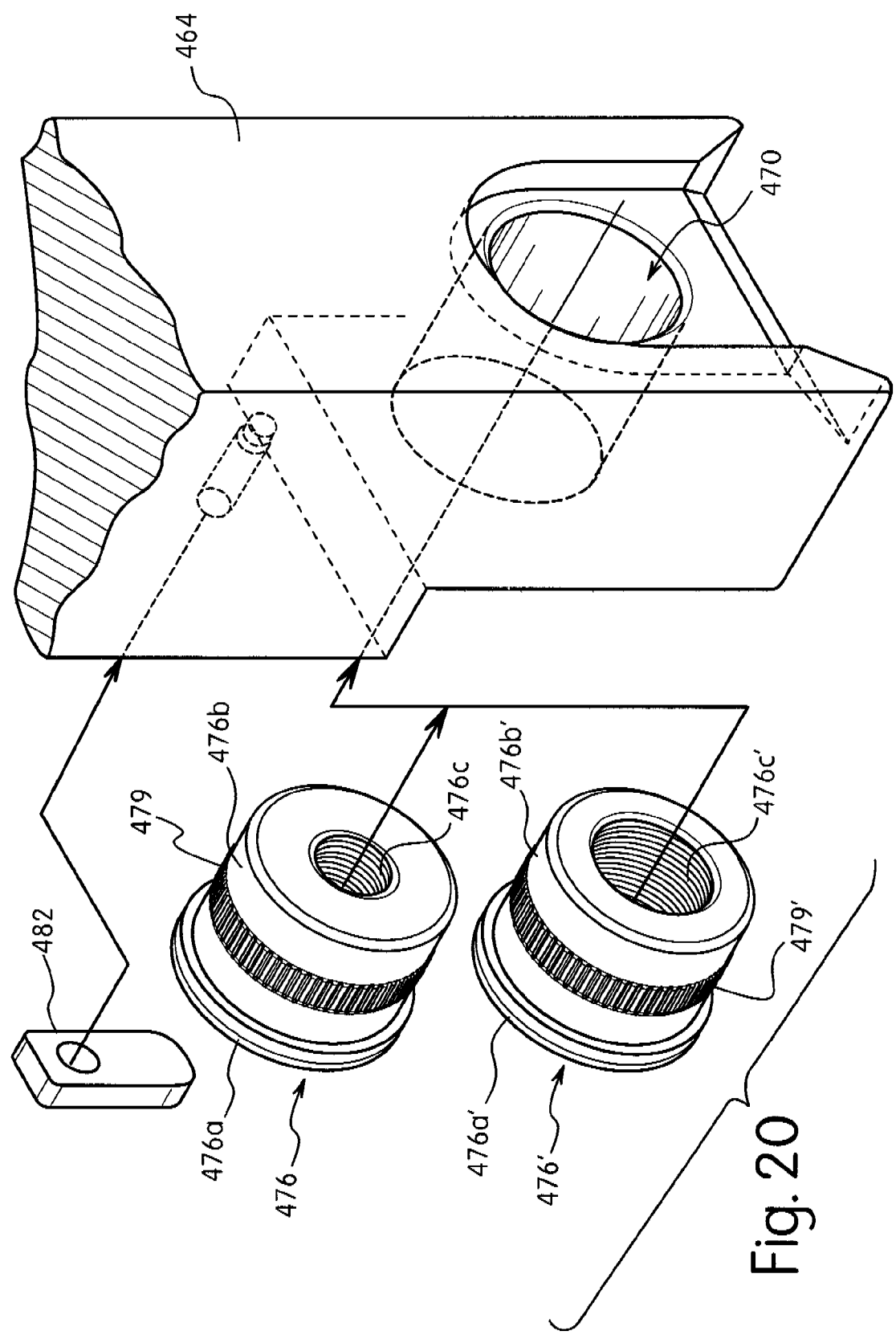
FIG. 20 is an exploded perspective view of the fork leg and the wheel securing adapter in accordance with the fourth embodiment of the present invention.

Referring now to FIGS. 18 to 20, a modified outer tube 464 with a wheel securing adapter 476 is illustrated in accordance with a fourth embodiment of the present invention. The modified outer tube 464 replaces the outer tube 64, and thus, the remaining structure of the fork leg 56 is the same as discussed above. The only difference between the modified outer tube 464 and the outer tube 64 is that the axle mounting bore 70 has been changed to a non-threaded axle mounting bore 470. The wheel securing adapter 476 includes a first adapter portion 476a and a second adapter portion 476b with an internally threaded bore 476c extending completely through both the first and second adapter portions 476a and 476b. Basically, the wheel securing adapter 476 is identical to the wheel securing adapter 76, discussed above, except that the dimensions have been changed and the external surface of the second adapter portion 476b has a plurality of axially extending serrations 479. The serrations 479 of the wheel securing adapter 476 create a secure press fit connection with the axle mounting bore 470 of the modified outer tube 464. The serrations 479 are formed in a middle section of the external surface of the second adapter portion 476b with the serrations 479 being axially spaced from first and second axial ends of the second adapter portion 476b by cylindrical portions that are free of the serrations. Instead of such a secure press fit connection, a plurality of axially extending splines can be formed to the bore 470 so as to releasably mate with the serrations 479 of the adapter 476. In such an arrangement, the second adapter portion of the adapter 476 is mounted into an axle mounting bore 470 of the modified outer tube 464 so that the rotational position of the adapter 476 is adjustable. Optionally, a locking tab 482 can be attached to the modified outer tube 464 by the screw 80 to securely retain the adapter 476 to the modified outer tube 464. Since the remaining structures and/or arrangements are the same as the corresponding structures and/or arrangements of one of the prior embodiments, the outer tube 464 and the wheel securing adapter 476 will not be discussed in further detail.

As seen in FIG. 20, different size wheel securing adapters can be used with the front fork so that different size wheel securing axles can be used. For example, an additional wheel securing adapter 476' is illustrated that includes a first adapter portion 476a' and a second adapter portion 476b' with an internally threaded bore 476c' extending completely therethrough and external serrations 479'. The additional wheel securing adapter 476' is identical to the wheel securing adapter 476, except that the internally threaded bore 476c' has a larger diameter than the through bore 476c.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle wheel securing adapter comprising:
a first portion having a first maximum width; and
a second portion extending axially from the first portion, with the second portion having a second maximum width that is smaller than the first maximum width of the first portion to form an axially facing abutment surface therebetween, the second portion having an external surface with an external thread to be threaded into an axle mounting opening of a bicycle front fork so that a rotational position of the adapter is adjustable,
the first and second portions being arranged to form a first end face on the first portion and a second end face on the second portion with an internally threaded bore extending axially from the second end face into the second portion.

2. The bicycle wheel securing adapter according to claim 1, wherein
the threaded bore is a through bore having a first opening in the first end face on the first portion.

3. The bicycle wheel securing adapter according to claim 1, wherein
the first portion has an external surface with a plurality of recesses.

4. A bicycle wheel securing adapter comprising:
a first portion having a first maximum width; and
a second portion extending axially from the first portion, with the second portion having a second maximum width that is smaller than the first maximum width of the first portion to form an axially facing abutment surface therebetween, the second portion being configured and arranged to be mounted into an axle mounting opening of a bicycle front fork so that a rotational position of the adapter is adjustable,
the first and second portions being arranged to form a first end face on the first portion and a second end face on the second portion with an internally threaded bore extending axially from the second end face into the second portion,
the second portion having an external surface with a plurality of axially extending splines with the splines being parallel.

5. A bicycle wheel securing adapter comprising:
a first portion having a first maximum width; and
a second portion extending axially from the first portion, with the second portion having a second maximum width that is smaller than the first maximum width of the first portion to form an axially facing abutment surface therebetween, the second portion being configured and arranged to be mounted into an axle mounting opening of a bicycle front fork so that a rotational position of the adapter is adjustable,
the first and second portions being arranged to form a first end face on the first portion and a second end face on the second portion with a threaded bore extending axially from the second end face into the second portion,
the second portion having an external surface with a plurality of serrations formed in a middle section of the external surface with the serrations being axially spaced from first and second axial ends of the second portion by cylindrical portions that are free of the serrations.

6. A bicycle front fork comprising:
a fork stem;
a first fork leg including a first upper end coupled to the fork stem and a first lower end with a first axle mounting opening;
a second fork leg including a second upper end coupled to the fork stem and a second lower end with a second axle mounting opening; and
a wheel securing adapter disposed in the second axle mounting opening, the wheel securing adapter including an internally threaded bore and an external surface configured and arranged to cooperate with the second axle mounting opening to prevent at least one of relative axial movement and relative rotational movement of the wheel securing adapter within the second axle mounting opening, the wheel securing adapter including
a first portion having a first maximum width, and
a second portion extending axially from the first portion, with the second portion having a second maximum width that is smaller than the first maximum width of the first portion to form an axially facing abutment surface therebetween, the second portion having an external surface with an external thread threaded into the second axle mounting opening of the second fork leg so that a rotational position of the adapter is adjustable,
the first and second portions being arranged to form a first end face on the first portion and a second end face on the second portion with an internal threaded bore extending axially from the second end face into the second portion.

7. The bicycle front fork according to claim 6, wherein the threaded bore of the wheel securing adapter is a through bore having a first opening in the first end face on the first portion.

8. The bicycle front fork according to claim 6, wherein the first portion has an external surface with a plurality of recesses.

9. A bicycle front fork comprising:
a fork stem;
a first fork leg including a first upper end coupled to the fork stem and a first lower end with a first axle mounting opening;
a second fork leg including a second upper end coupled to the fork stem and a second lower end with a second axle mounting opening; and
a wheel securing adapter disposed in the second axle mounting opening, the wheel securing adapter including an internally threaded bore and an external surface configured and arranged to cooperate with the second axle mounting opening to prevent at least one of relative axial movement and relative rotational movement of the wheel securing adapter within the second axle mounting opening, the wheel securing adapter including
a first portion having a first maximum width, and
a second portion extending axially from the first portion, with the second portion having a second maximum width that is smaller than the first maximum width of the first portion to form an axially facing abutment surface therebetween, the second portion being mounted into the second axle mounting opening of the second fork leg so that a rotational position of the adapter is adjustable,
the first and second portions being arranged to form a first end face on the first portion and a second end face on the second portion with an internally threaded bore extending axially from the second end face into the second portion,
the second portion of the wheel securing adapter having an external surface with a plurality of axially extending splines with the splines being parallel.

10. A bicycle front fork comprising:
a fork stem;
a first fork leg including a first upper end coupled to the fork stem and a first lower end with a first axle mounting opening;
a second fork leg including a second upper end coupled to the fork stem and a second lower end with a second axle mounting opening; and
a wheel securing adapter disposed in the second axle mounting opening, the wheel securing adapter including an internally threaded bore and an external surface configured and arranged to cooperate with the second axle mounting opening to prevent at least one of relative axial movement and relative rotational movement of the wheel securing adapter within the second axle mounting opening, the wheel securing adapter including
a first portion having a first maximum width, and
a second portion extending axially from the first portion, with the second portion having a second maximum width that is smaller than the first maximum width of the first portion to form an axially facing abutment surface therebetween, the second portion being mounted into the second axle mounting opening of the second fork leg so that a rotational position of the adapter is adjustable,
the first and second portions being arranged to form a first end face on the first portion and a second end face on the second portion with an internally threaded bore extending axially from the second end face into the second portion,
the second portion of the wheel securing adapter having an external surface with a plurality of serrations formed in a middle section of the external surface with the serrations being axially spaced from first and second axial ends of the second portion by cylindrical portions that are free of the serrations.

11. The bicycle front fork according to claim 6, wherein the second fork leg includes a cutout surrounding the second axle mounting opening on an inner side surface of the second fork leg that faces the first fork leg of the second lower end, the cutout of the second lower end including
a stepped inner surface configured to directly abut against a hub axle end, and
at least one tapered guide portion extending from the stepped inner surface for inserting the hub axle end into the cutout against the stepped inner surface from a direction parallel to the longitudinal axis of the second fork leg.

12. The bicycle front fork according to claim 11, wherein the first lower end of the first leg has a cutout that is the mirror image of the cutout of the second lower end of the second leg.

13. The bicycle front fork according to claim 11, wherein the at least one tapered guide portion includes a pair of opposed end guide surfaces and a central guide surface extending between the opposed end guide surfaces.

14. The bicycle front fork according to claim 11, wherein the at least one tapered guide portion includes a pair of opposed end guide surfaces that are inclined relative to a pair of lateral abutment surfaces.

15. The bicycle front fork according to claim 11, wherein the at least one tapered guide portion includes a central guide surface that is inclined relative to an axial abutment surface.

16. A bicycle front fork comprising:
a fork stem;
a first fork leg including a first upper end coupled to the fork stem and a first lower end with a first axle mounting opening; and
a second fork leg including a second upper end coupled to the fork stem and a second lower end with a second axle mounting opening and a cutout surrounding the second axle mounting opening on an inner side surface of the second fork leg that faces the first lower end of the first fork leg, the cutout of the second lower end including an axial abutment surface facing the first lower end of the first fork leg to directly abut against a hub axle end face, a peripheral abutment surface extending from the axial abutment surface towards the first lower end of the first fork leg to directly abut against a hub axle side surface, and at least one tapered guide portion disposed at a lower part of the cutout and extending away from the axial abutment surface towards a lowest point of the second lower end of the second fork leg, with the at least one tapered guide portion being inclined relative to a center axis of the second axle mounting opening in a direction sloping away from the first lower end of the first fork leg as the tapered guide portion approaches the lowest point of the second lower end of the second fork leg for inserting a hub axle end into the cutout from a direction parallel to longitudinal axes of the fork legs.

17. The bicycle front fork according to claim 16, wherein the at least one tapered guide portion includes a pair of opposed end guide surfaces and a central guide surface extending between the opposed end guide surfaces.

18. The bicycle front fork according to claim 16, wherein the at least one tapered guide portion includes a pair of opposed end guide surfaces that are inclined relative to a pair of lateral abutment surfaces.

19. The bicycle front fork according to claim 16, wherein the at least one tapered guide portion includes a central guide surface that is inclined relative to an axial abutment surface.

20. The bicycle front fork according to claim 16, wherein the first axle mounting opening is an unthreaded through bore and the second axle mounting opening is a threaded bore.

21. The bicycle front fork according to claim 16, wherein the first lower end of the first leg has a cutout that is the mirror image of the cutout of the second lower end of the second leg.

22. A bicycle comprising a frame unit including a main frame;

a front fork rotatably coupled to the main frame, the front fork including a fork stem with a pair of fork legs coupled to the fork stem;

a rear bicycle wheel including a rear hub with a rear axle coupled to the main frame; and a front bicycle wheel including a front hub with a front wheel securing axle coupled to the front fork, the front fork including a wheel securing adapter mounted in an axle mounting opening of one of the fork legs, the wheel securing adapter including a first portion having a first maximum width, and a second portion extending axially from the first portion, with the second portion having a second maximum width that is smaller than the first maximum width of the first portion to form an axially facing abutment surface therebetween, the second portion having an external surface with an external thread threaded into the axle mounting opening so that a rotational position of the adapter is adjustable, the first and second portions being arranged to form a first end face on the first portion and a second end face on the second portion with an internally threaded bore extending axially from the second end face into the second portion.

23. A bicycle comprising:

a frame unit including a main frame;

a front fork rotatably coupled to the main frame, the front fork including a fork stem with a pair of fork legs coupled to the fork stem;

a rear bicycle wheel including a rear hub with a rear axle coupled to the main frame; and a front bicycle wheel including a front hub with a front wheel securing axle coupled to the front fork, one of fork legs having a lower end with an axle mounting opening and a cutout surrounding the axle mounting opening on an inner side surface of the fork leg that faces the other fork leg, the cutout including an axial abutment surface facing the first lower end of the first fork leg to directly abut against a hub axle end face of the front wheel securing axle coupled to the front fork, a peripheral abutment surface extending from the axial abutment surface towards the first lower end of the first fork leg to directly abut against a hub axle side surface of the front wheel securing axle coupled to the front fork, and at least one tapered guide portion disposed at a lower part of the cutout and extending away from the axial abutment surface towards a lowest point of the second lower end of the second fork leg, with the at least one tapered guide portion being inclined relative to the front wheel securing axle in a direction sloping away from the first lower end of the first fork leg as the tapered guide portion approaches the lowest point of the second lower end of the second fork leg for inserting a hub axle end into the cutout from a direction parallel to longitudinal axes of the fork legs.

* * * * *